United States Patent [19]

Sugiura et al.

[11] Patent Number: 5,465,164
[45] Date of Patent: Nov. 7, 1995

[54] IMAGE PROCESSING METHOD AND DEVICE FOR THE SAME

[75] Inventors: Susumu Sugiura, Atsugi; Yoshinobu Mita, Kawasaki, both of Japan

[73] Assignee: Canon Kabushiki Kaisha, Tokyo, Japan

[21] Appl. No.: 868,103

[22] Filed: Apr. 14, 1992

[30] Foreign Application Priority Data

Apr. 15, 1991 [JP] Japan ................... 3-082403
Apr. 8, 1992 [JP] Japan ................... 4-087114

[51] Int. Cl.6 ................................ H04N 1/41
[52] U.S. Cl. .............. 358/448; 358/432; 358/458; 348/384
[58] Field of Search ............... 358/448, 458, 358/433, 56, 80, 133, 135, 136, 500, 528, 434, 527, 138, 56, 426, 261.3, 261.4, 432, 479, 909, 13, 85, 209

[56] References Cited

U.S. PATENT DOCUMENTS

| | | | |
|---|---|---|---|
| 4,780,761 | 10/1988 | Daly et al. | 358/133 |
| 4,782,398 | 11/1988 | Mita | 358/280 |
| 4,905,294 | 2/1990 | Sugiura | 382/9 |
| 4,974,078 | 11/1990 | Tsai | 358/133 |
| 4,984,076 | 1/1991 | Watanabe et al. | 358/133 |
| 5,060,280 | 10/1991 | Mita et al. | 382/33 |
| 5,073,820 | 12/1991 | Nakagawa et al. | 358/133 |
| 5,079,621 | 1/1992 | Daly et al. | 358/13 |
| 5,142,380 | 8/1992 | Sakagami et al. | 358/432 |
| 5,189,530 | 2/1993 | Fujii | 358/458 |
| 5,216,516 | 6/1993 | Tanaka et al. | 358/426 |
| 5,216,712 | 6/1993 | Shimada et al. | 358/133 X |
| 5,223,926 | 6/1993 | Stone et al. | 358/133 |
| 5,251,020 | 10/1993 | Sugiyama | 358/500 |
| 5,253,055 | 10/1993 | Civanlar et al. | 358/133 |
| 5,260,808 | 11/1993 | Fujii | 358/458 |

FOREIGN PATENT DOCUMENTS 416918  3/1991  European Pat. Off. ......... H04N 7/13

OTHER PUBLICATIONS

Leger et al., "Still Picture Compression Algorithms Evaluated for International Standardisation", IEEE Global Telecommunications Conference vol. 2, pp. 1028–1032 (Nov. 1988).

Groll et al., "Using the 8 bit CCIR Recommendation 601 Digital Interface", IBC Int'l, Broad Jayant et al., Digital Coding of Waveforms, Prentice Hall, pp. 351–371 (1984).

Primary Examiner—Paul Ip
Attorney, Agent, or Firm—Fitzpatrick, Cella, Harper & Scinto

[57] ABSTRACT

Disclosed is an image processing device which comprises a conversion means for converting an image data to a space frequency component, a quantization means for quantizing the space frequency component converted by the conversion means, and a control means for controlling the quantization means so that a quantization error produced when the converted space frequency component is quantized by the quantization means is diffused to nearby space frequency components.

9 Claims, 10 Drawing Sheets

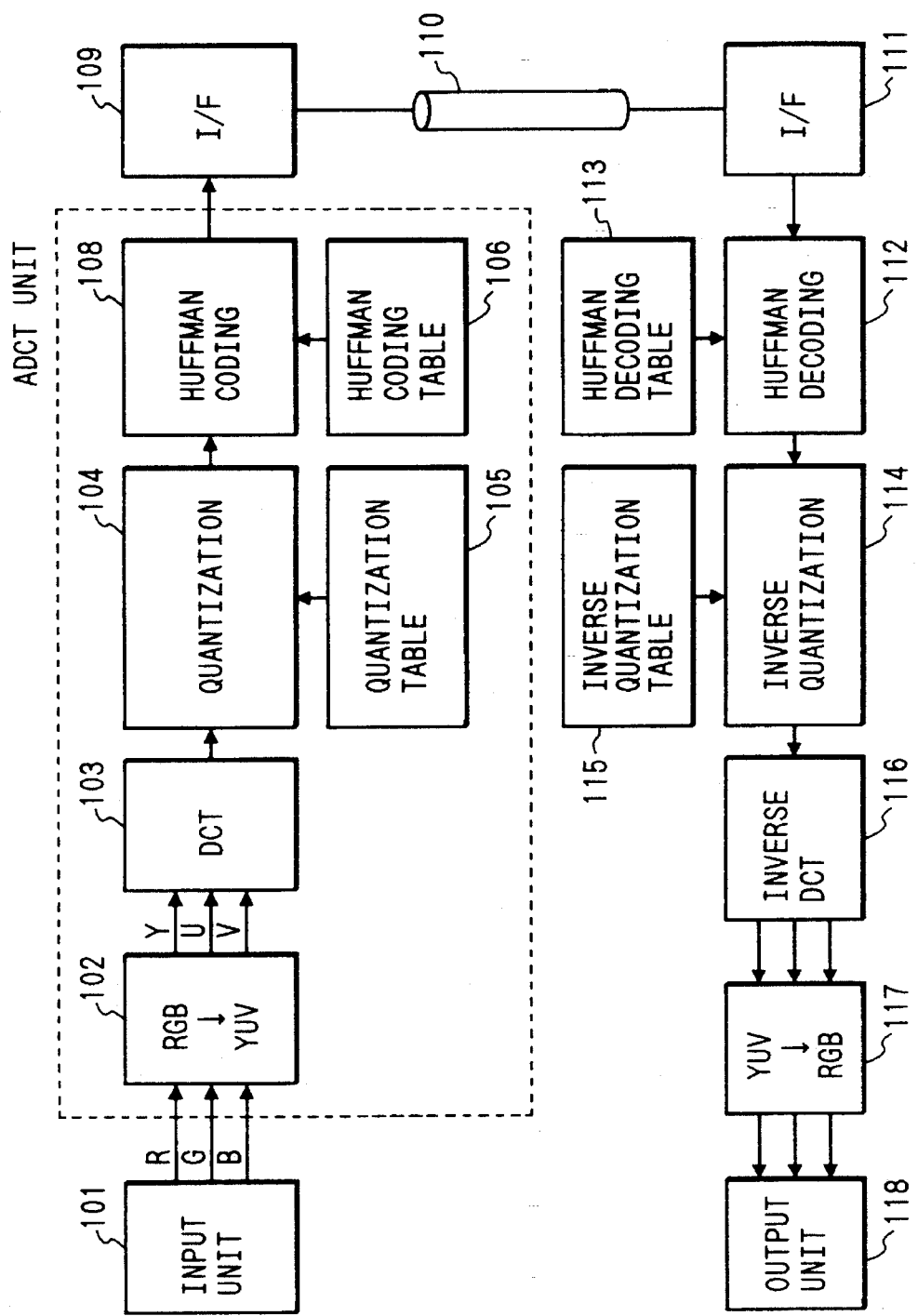

| 00 | 10 | 11 | 02 | 11 | 20 | 30 | 21 | 12 | 03 | 04 |}------{| 77 |

| 50 | 35 | 45 | 75 | 83 | 21 | 13 | 33 | 47 | 21 |}------{| 5 | 0 |

| 10 | 10 | 10 | 10 | 20 | 20 | 20 | 30 | 30 |}------{| 40 | 40 |

| 3 | 4 | 7 | 8 | 1 | 0 | 1 | 1 | 0 |}------{| 0 | 0 |

DIVISION RATIO $$EX \begin{pmatrix} A \\ B \\ C \end{pmatrix} = \begin{pmatrix} 0.4 \\ 0.2 \\ 0.4 \end{pmatrix}$$

IMAGE PROCESSING METHOD AND DEVICE FOR THE SAME

BACKGROUND OF THE INVENTION

1. Field of the Invention

The present invention relates to an image processing method and device for the same by which image data is quantized.

2. Related Background Art

At present, an Adaptive Discrete Cosine Transform ADCT (Adaptivraphic Expert Group) system is intended to be standardized as a compression system of a multi-value image data by JPEG (Joint Photographic Expert Group).

Also, it is contemplated to use the ADCT system in the field of a color image communication, in particular, in the field of a color facsimile.

Nevertheless, the above ADCT system has been studied to be applied to an image having the relatively small number of pixels such as an image on a CRT.

Therefore, the application of the ADCT system, as it is, to a field such as the color facsimile requiring a high resolution gives rise to a new problem. More specifically, when the ADCT system is employed for the color facsimile, as it is, a deterioration of image quality such as shade off, dislocation and spread of color is caused in the field of fine lines of characters, graphics and the like.

Further, when data compressed by the ADCT system is compared with data prior to compression, density is not preserved and thus image quality is deteriorated.

SUMMARY OF THE INVENTION

Taking the above problems into consideration, a first object of the present invention is to provide an image processing method and a device for the same by which image quality can be improved.

Another object of the present invention is to provide an image processing method and a device for the same by which a quantized error produced in quantization is reduced.

To achieve the above objects, according to a preferred embodiment of the present invention, there is disclosed an image processing device which comprises a conversion means for converting an image data to a space frequency component, a quantization means for quantizing the space frequency component converted by the conversion means, and a control means for controlling the quantization means so that a quantization error produced when the converted space frequency component is quantized by the quantization means is diffused to nearby space frequency components.

Further, the present invention has another object for further improving an image compression method referred to as ADCT.

Furthermore, the present invention has a further object for providing an image processing method and device for the same by which a compression ratio as well as image quality are improved.

Other objects and advantages of the present invention will become apparent from the following embodiments when taken in conjunction with the description of the accompanying drawings.

BRIEF DESCRIPTION OF THE DRAWINGS

FIG. 1 is a block diagram showing the arrangement of an embodiment according to the present invention;

DETAILED DESCRIPTION OF PREFERRED EMBODIMENTS

Figures 2A, 2B, 3A, 3B, 3C:
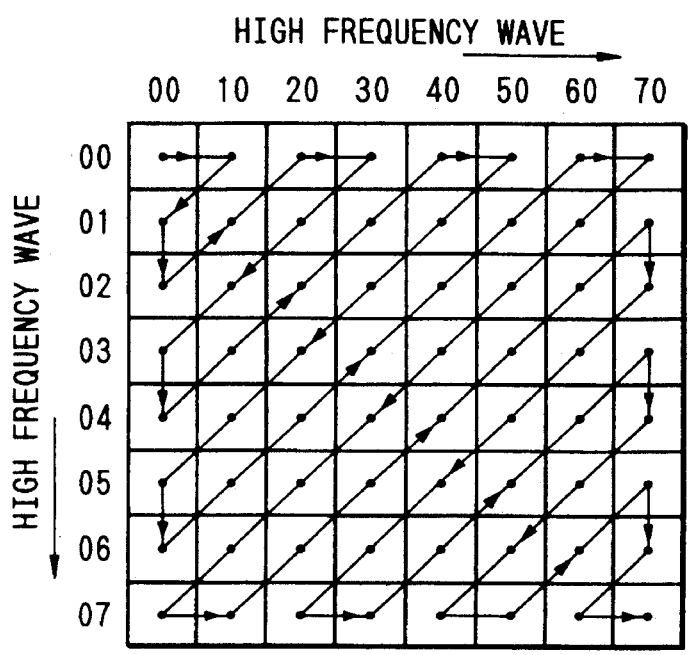
FIGS. 2A and 2B are diagrams showing a zig-zag scanning.
FIGS. 3A–3C are diagrams showing a conventional quantization method.

FIG. 1 is a block diagram showing an embodiment of an image processing device according to the present invention, wherein 101 designates an image input unit composed, for example, of a color scanner arranged as CCD line sensors for R, G, B; 102 designates a color component conversion unit for converting R, G, B signals of each pixel produced in the image input unit 101 to YUV (lightness, chromaticness and hue) component signals; and 103 designates a DCT circuit for causing each component signal of YUV to be subjected to a discrete cosine conversion to thereby perform an orthogonal conversion from a true space component to a frequency space component; 104 designates a quantization unit for quantizing the orthogonally converted space frequency component by a quantization coefficient stored in a quantization table 105; 107 designates a line through which two-dimensional block data, which is quantized and made to linear data by zig-zag scanning, is transmitted; 108 designates a Huffman coding circuit having a DC component composed of category information and a data value obtained from a difference signal and an AC component classified to categories based on the continuity of zero and thereafter provided with a data value; 106 designates a Huffman coding table wherein a document appearing more frequently is set to a shorter code length; and 109 designates an interface with a communication line through which a compressed image data is transmitted to a circuit 110.

On the other hand, data is received by an I/F 111 on a receiving side through a process completely opposite to that when the compressed data is transmitted. More specifically, the data is Huffman decoded by a Huffman decoding unit 112 in accordance with a coefficient set from a Huffman decoding table 113 arranged in the same way as that of the Huffman coding table 106 and then inverse quantized by an inverse quantizing unit 114 in accordance with a coefficient set from an inverse quantizing table 115. Next, the thus obtained data is inverse DCT converted by an inverse DCT conversion unit 116 and converted from the YUV color components to the RGB color components by a color component conversion unit 117 so that a color image is formed by an image output unit 118. The image output unit 118 can provide a soft copy such as a display and the like and a hard copy printed by a laser beam printer, ink jet printer and the like.

Although the above deterioration of image quality is caused by various factors, one of main factors is contemplated to be that an error (remainder) produced in quantization performed by a quantization table following to a processing performed by DCT is cut off.

The present invention is devised to preserve the error amount as effectively as possible to thereby prevent the deterioration of image quality as much as possible.

Thus, according to embodiments of the present invention, a reminder or error produced when quantization is performed by a quantization table is multi-dimensionally diffused to nearby frequency components to keep the frequency components of an original image as much as possible so that an image with less deteriorated quality can be reproduced.

A DCT portion as a main portion of the present invention will be further described here prior to the description of the characteristic portion of the embodiments of the present invention.

FIG. 2A shows an arrangement of frequency component values subjected to a discrete cosine conversion of 8×8 which is a base of the DCT portion. Although this arrangement is basically a two-dimensional frequency structure, it can be made to a linear frequency arrangement by a zig-zag scanning, as shown in FIG. 2B. In FIG. 2B, a DC component, and linear frequency component up to n-dimensional frequency component are arranged from the left side thereof. Each numeral in FIG. 2B is obtained by adding an address in a vertical direction and an address in a horizontal direction in FIG. 2A, and thus these numerals in FIG. 2B show an address and do not show a value of a frequency component.

FIGS. 3A–3C show a conventional quantization system, and FIG. 3A shows a value of a frequency component just after DCT and FIG. 3B shows a quantization table. FIG. 3C shows a result of quantization performed by using FIGS. 3A and 3B, wherein the values shown in FIG. 3A are simply divided by the values shown FIG. 3B and portions other than an integer portion are cut off, from which it is assumed that a considerable error is caused by the cutting off.

FIG. 4A–4E show a portion of an embodiment of the present invention.

Figure 4A:
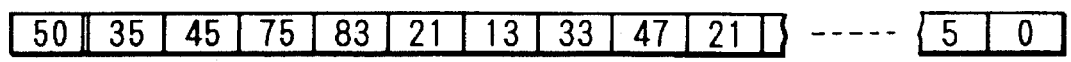
FIGS. 4A–4E are diagrams showing a quantization method according to the present invention.
Figure 4B:
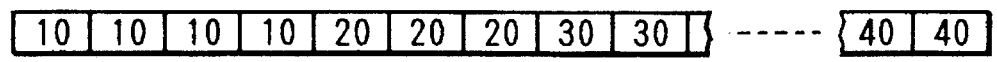
Figure 4C:
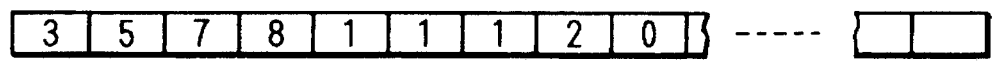
Figure 4D:
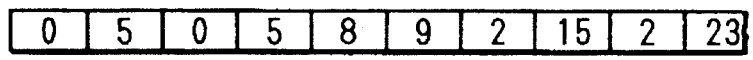
Figure 4E:
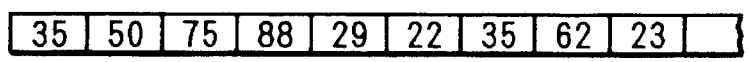

FIGS. 4A, 4B and 4C correspond to FIGS. 3A, 3B and 3C, respectively, and FIG. 4D shows a reminder value after quantization has been performed. For example, since the data value of a first frequency component is 35 and a corresponding table value is 10, a value 3 is obtained after quantization and thus a remainder is 5. This remainder 5 is shown in the second box in FIG. 4D. Therefore, a second frequency component 45 is made to 50 by being added with the remainder 5 in the previous frequency. Since this value 50 is divided by a table value 10, a quantized value of 5 is obtained with a reminder of 0. An image of good quality can be reproduced on a receiving side in such a manner that a frequency component loss caused by cutting off is reduced by diffusing a remaining error component to a nearby frequency component, as described above.

Figure 5:
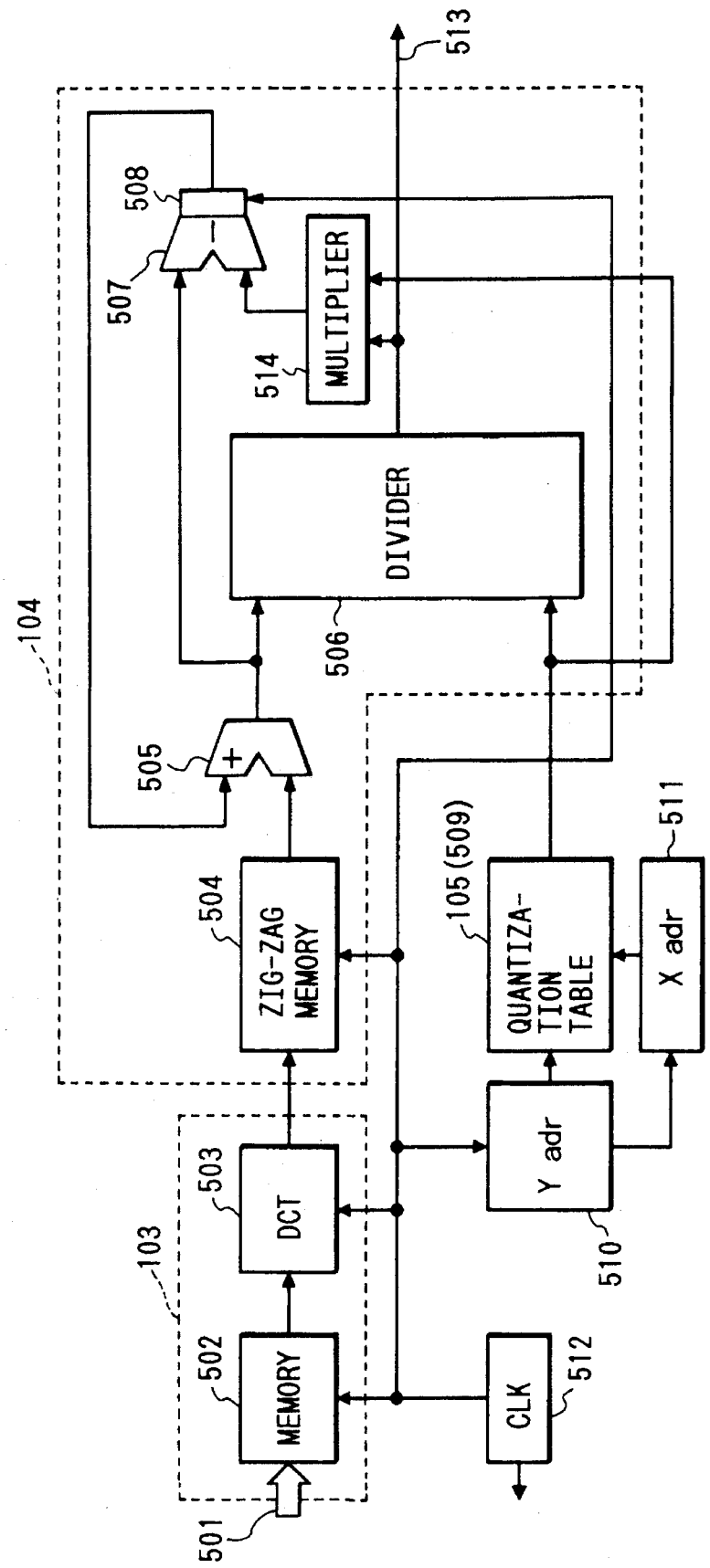
FIG. 5 is a block diagram showing a characteristic portion of the present invention.

FIG. 5 shows a specific arrangement for performing the processing shown in FIG. 4, wherein 501 designates color decomposition data of three colors YUV input from the color component conversion unit 102; 502 designates a buffer memory composed, for example, of an FIFO for a plurality of lines for extracting data for each block of 8×8 pixel from the color decomposition data of the three colors; 503 designates a DCT conversion circuit, 504 designates a zig-zag memory for storing a space frequency component produced by being subjected to the discrete cosine conversion and further subjected to the zig-zag scanning conversion as described above; and 505 designates an adder for adding data from the zig-zag memory 504 with data delayed by a clock and supplied from a register 508 and outputting resultant data. This addition operation of the adder 505 corresponds to an addition operation of the remainder value and next data in FIG. 4. The data from the adder 505 is divided by a divider 506 and only the integer portion of resultant data is output as 513. Designated at 507 is a subtracter for subtracting a value obtained by multiplying data of 513 made to integer by a quantization coefficient (an output from a multiplier 514) from data supplied from the adder 505 to thereby create remainder data. The remainder data calculated by the subtracter 507 is stored in the register 508 after delayed by a clock. On the other hand, a value of the dominator in the divider 506 is a memory portion in which quantization data stored in 509 is stored. Designated at 510 and 511 are address counters for extracting data from 509. These address counters 510 and 511 are operated in synchronism with a clock from a clock generator 512 together with the buffer memory 502, DCT conversion circuit 503, memory 504, and register 508.

Note, although a system based on a linear error diffusion is described in the above example, it is apparent that the same effect can be obtained in such a manner that errors are two-dimensionally diffused about the line connecting the point 00, 00 to the point 70, 07 in FIG. 2A, and this is also included in the present invention.

According to this embodiment, since a frequency component conventionally cut off by the DCT quantization portion is accumulated to a nearby frequency component and corrected, a reproduced image is less deteriorated and thus a reproduced image of good quality can be obtained. Moreover, since the basic requirements of the ADCT are observed, a special extension circuit is not required on a receiving side and thus this invention is expected to greatly contribute to a communication of a color image hereinafter.

Figure 6:
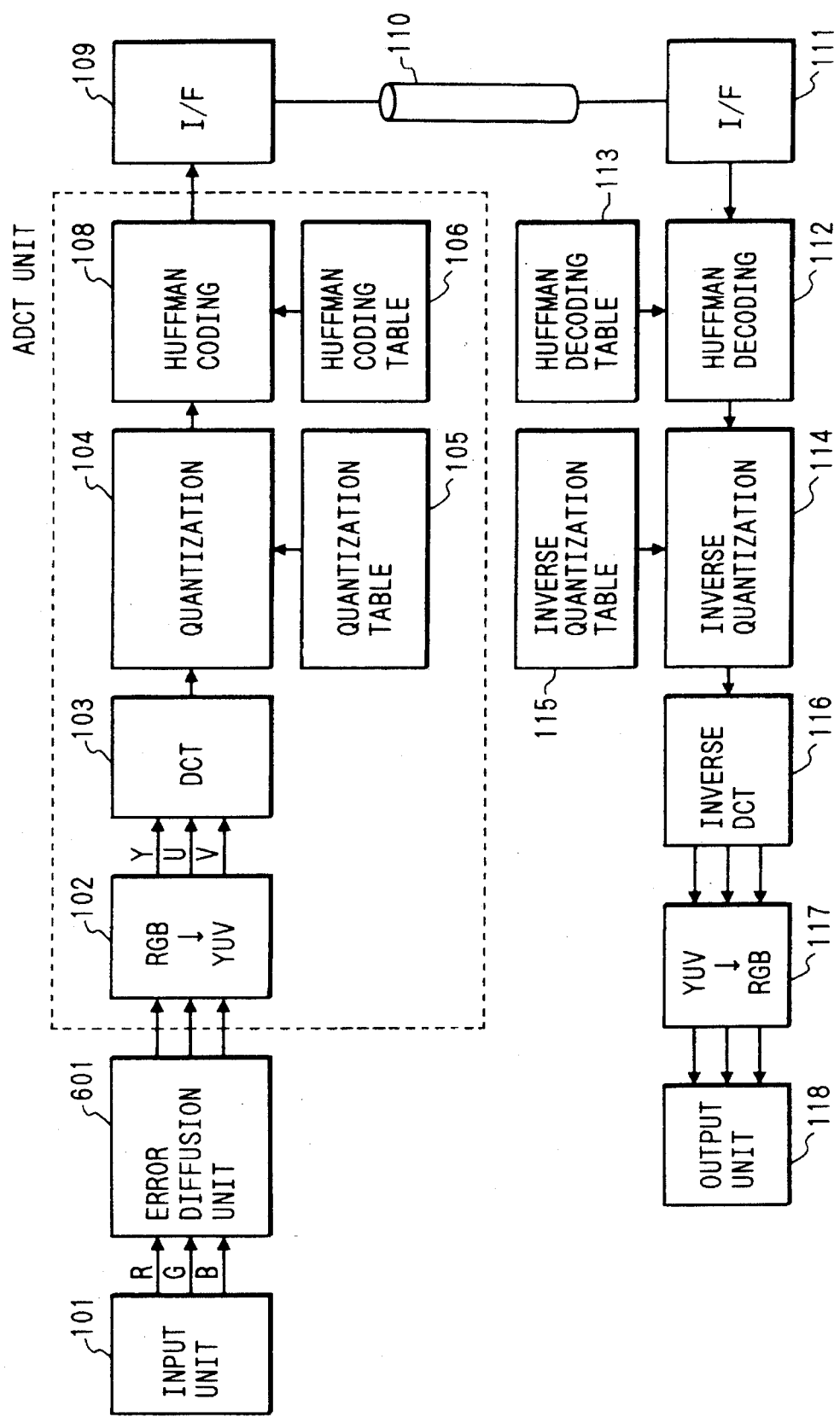
FIG. 6 is a diagram showing a second embodiment of the present invention.

Next, FIG. 6 is a block diagram showing another embodiment according to the present invention, wherein 101 designates an image input unit composed, for example, of a color scanner arranged as CCD line sensors for R, G, B.

An output from the image input unit 101 is processed in an error diffusion unit 601 such that the bit number of the image data in the input unit 101 is diminished and an error produced in the process of diminishing the bit number is diffused to some nearby pixels of a subject pixel. Therefore, an output from the error diffusion unit 601 is obtained in such a manner that a result obtained by diffusing the errors of the nearby pixels is added to the value of the subject pixel and the number of bits of the subject pixel is diminished. This output is processed such that the RGB signals thereof are converted to YUV (lightness, chromaticness, hue) component signals by a color component conversion unit 102, next each component signal of the YUV is subjected to a discrete cosine conversion by a DCT circuit 103 and thus a true space component is orthogonally converted to a frequency space component. Designated at 104 is a quantization unit for quantizing the orthogonally converted space frequency component by a quantization coefficient stored in a quantization table 105; 107 designates a line through which two-dimensional block data, which is quantized and made to linear data by zig-zag scanning, is transmitted; designated at 108 is a Huffman coding circuit having a DC component composed of category information and a data value obtained from a difference signal and an AC component classified to categories based on the continuity of zero and thereafter provided with a data value designated at 106 is a Huffman coding table wherein a document appearing more frequently is set to a shorter code length; and designated at 109 is an interface with a communication line through which a compressed image data is transmitted to a circuit 110.

On the other hand, data is received by an I/F 111 on a receiving side through a process completely opposite to that when the compressed data is transmitted. More specifically, the data is Huffman decoded by a Huffman decoding unit 112 in accordance with a coefficient set from a Huffman decoding table 113 arranged in the same way as that of the Huffman coding table 106 and then inverse quantized by an inverse quantizing unit 114 in accordance with a coefficient set from an inverse quantizing table 115. Next, the thus obtained data is inverse DCT converted by an inverse DCT conversion unit 116 and converted from the YUV color components to the RGB color components by a color component conversion unit 117 so that a color image is formed by an image output unit 118. The image output unit 118 can provide a soft copy such as a display and the like and a hard copy printed by a laser beam printer, ink jet printer and the like.

Therefore, in this embodiment, an input image of high quality can be compressed by an ADCT conversion circuit without being affected by the number of bits of the input image in such a manner that the input image is read by the input unit 101, the number of bits thereof is diminished without deteriorating the quality of the image by using an error diffusion method even if the number of quantized bits per pixel is increased and further the input image is subjected to an ADCT conversion. In addition, it is possible that the number of bits processed by the ADCT conversion circuit is made smaller than a usual number by diminishing the number of bits of an image data at the input unit to thereby make the scale of the ADCT conversion circuit smaller.

Further, the deterioration of image quality may be further restricted by using an improved ADCT shown in FIG. 5 in place of the ADCT unit shown in FIG. 6 and a quantization error produced after a DCT conversion is not cut off but effectively preserved by an error diffusion.

Figure 7A:
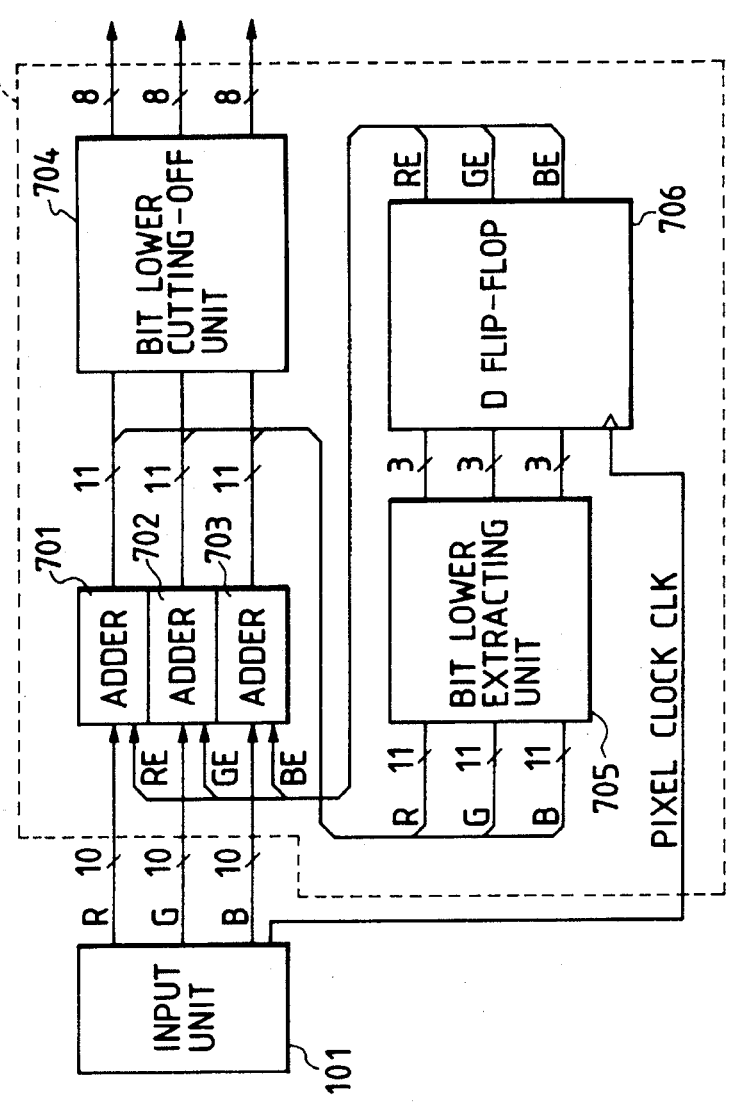
FIGS. 7A and 7B are diagrams showing an embodiment embodying an error diffusion unit 601.
Figure 7B:

FIG. 7A shows a first embodiment of the error diffusion unit 601. Image data of 10 bits input to the error diffusion unit 601 are first input to adders 701, 702 and 703 and added with diffusion errors of three color components output from a D-flipflop 706. Therefore, the data outputs from the adders 701, 702 and 703 have the number of bits up to 11 bits. The lower 3 bits of each of the outputs are cut off by a lower bit diminution unit 704 for cutting off bits and thus the output becomes a signal of 8 bits and supplied to a color component conversion unit 102. Further, a lower bit extracting unit 705 extracts 3 bits having the same value as that cut off by the lower bit diminution unit 704 from each of the outputs of 11 bits supplied from the adders 701, 702 and 703 and supplies the same to a D-flipflop 706. Each of outputs from the lower bit extracting unit 705 corresponds the diminution of bits performed at the lower bit diminution unit 704 or an error itself produced in the quantization. A pixel clock CLK in synchronism with the outputs from the input unit 101 is supplied to the D-flipflop 706 and thus a delay of a pixel is performed. Therefore, respective color component quantization errors RE, GE, BE output from the D-flipflop 706 are input to the adders 701, 702 and 703 together with pixel data spaced therefrom by a pixel and added therewith. Therefore, as shown in FIG. 7B, since a subject pixel (pixel being processed) is added with a quantization error positioned in front of it by a pixel, it can preserve a gradation corresponding to 10 bits regardless of the subject pixel being quantized to 8 bits by the lower bit diminution unit 704. To supplement the above description, an error produced by the cutting off process in the lower bit diminution unit 704 has a positive value. As a result, outputs from the adders have 11 bits without a sign.

Figure 8A:
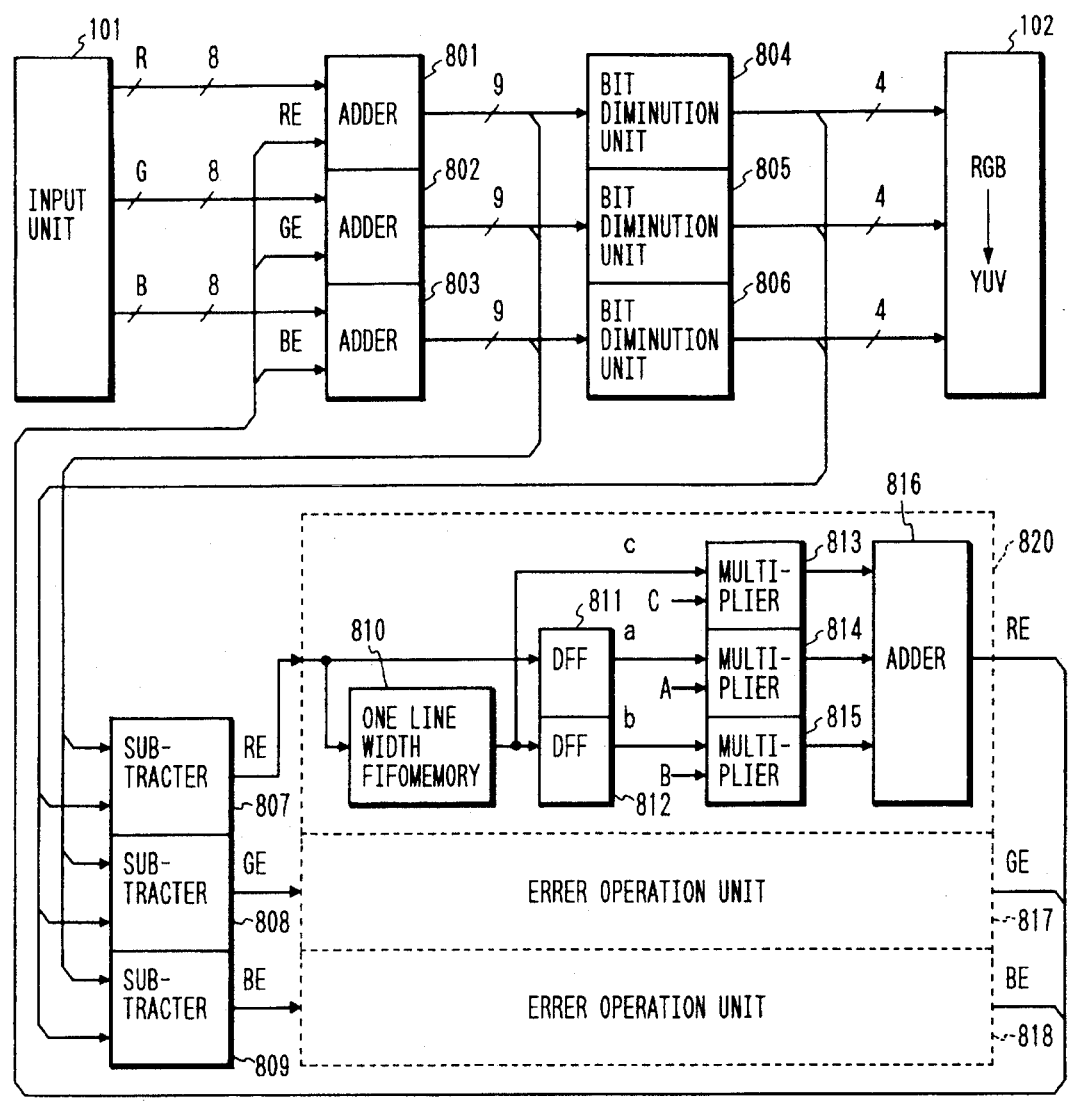
FIGS. 8A–8E are diagrams showing another embodiment embodying the error diffusion unit 601.

FIG. 8A shows a second embodiment of the error diffusion unit 601. Image data of respective color components R, G, B each having 8 bits and input from the input unit 101 to the error diffusion unit 601 are first input to adders 801, 802 and 803 and added with diffusion errors of three color components output from error operation units 820, 817 and 818. Therefore, the data outputs from the adders 801, 802 and 803 have the number of bits up to 9 bits. The bits of these outputs are diminished by bit diminution units 804, 805 and 806 and thus each of the outputs becomes a signal of 4 bits and is supplied to a color component conversion unit 102.

Figure 8B:
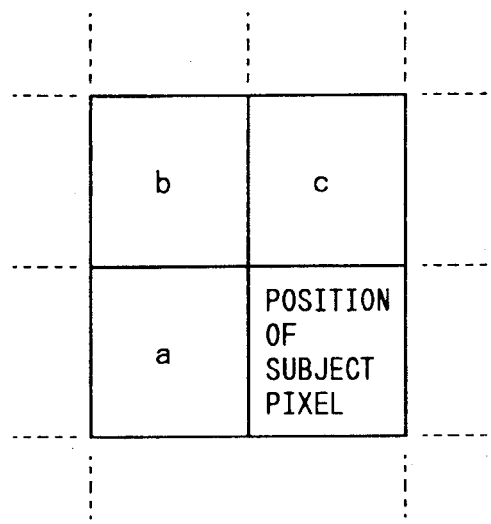
Figure 8C:
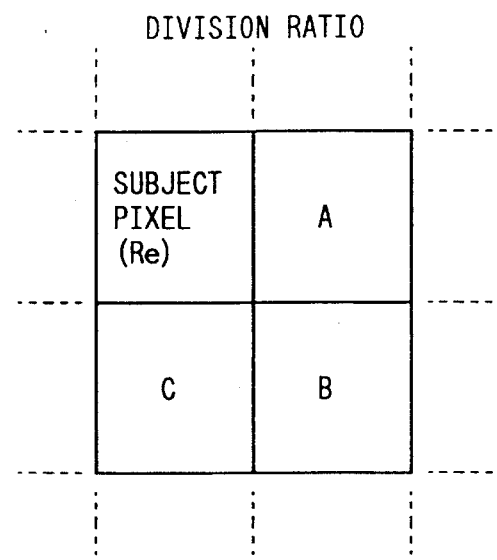
Figure 8D:
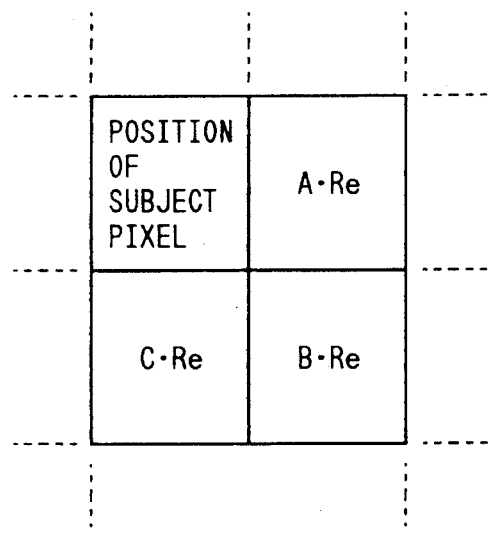
Figure 8E:
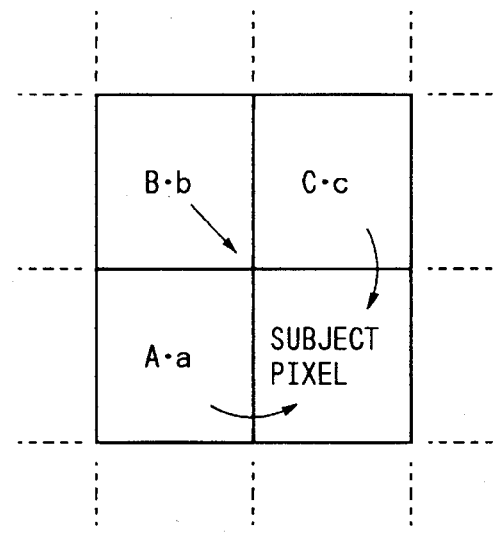

Further, the outputs from the adders 801, 802 and 803 are subtracted from the outputs from the bit diminution units 804, 805 and 806 by subtracters 807, 808 and 809 and thus data Re, Ge and Be can be obtained from errors 807, 808 and 809. Note that data from the bit diminution units 804, 805 and 806 are added with "0" and are normalized to correspond to 9 bits. As shown in FIG. 8C, these errors are divided to the circumference of the position of a subject pixel at division ratios of A, B and C, wherein (A, B, C) may be set, for example, to (0.4, 0.2, 0.4). Therefore, when errors produced in the circumference of the position of the subject pixel are assumed a, b and c as shown in FIG. 8B, the errors of A·a, B·b and C·c are added to the position of the subject pixel around the circumference thereof by the adders 801, 802 and 803, as shown in FIG. 8E. To supplement the above description, the error Re of the position of the subject pixel shown in FIG. 8C is divided as A·Re, B·Re and C·Re to the positions in the circumference of the subject pixel as shown in FIG. 8D.

Since the error operation units 820, 817 and 818 for calculating the total of divided errors RE, GE, BE have the same arrangement, the error operation unit 820 will be described here. The error Re input to the error operation unit 820 is delayed by a pixel and by a horizontal line through a D-flipflop DFF 811 and one line width FIFO memory 810, respectively and an output from the one line width FIFO memory 810 is further delayed by a pixel by a D-flipflop DFF 812. Therefore, errors a, b and c in the circumferential positions of the subject error position are obtained from the D-flipflops DFF 811 and DFF 812 and one line width FIFO memory 810 and these errors a, b and c are multiplied by a division ratios A, B and C, respectively, by multipliers 814, 815 and 813 and the total amount thereof A·a+B·b+C·c are calculated by an adder 816 to determine RE which is added with the value of the subject pixel by the adder 801.

Figure 9B:
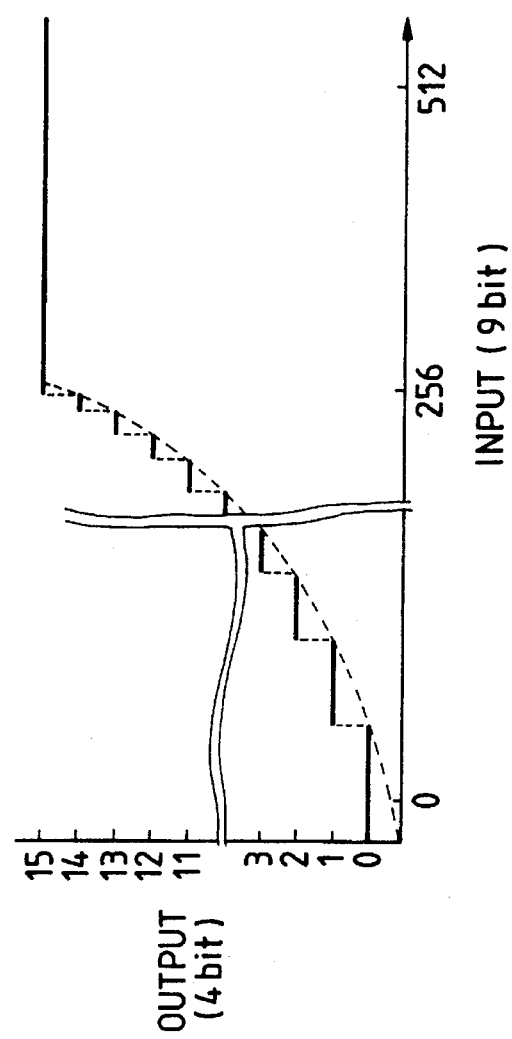
FIGS. 9A and 9B are diagrams explaining the content of a bit diminution unit.
Figure 9A:
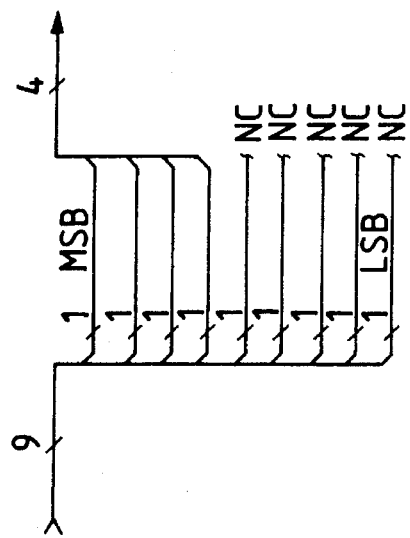

Next, operation of the bit diminution units 804, 805 and 806 will be described. As shown in FIG. 9A, a first example is a method of cutting off the lower 5 bits of an input signal of 9 bits and remains only the upper 4 bits thereof.

In a second example, the bit diminution unit is composed of a table using a ROM and RAM. FIG. 9B shows an example of the content of the table, which nonlinearly shows the relationship between an input of 9 bits and an output of 4 bits. In this second example, data exceeding 255 represented by an input of 8 bits are rounded to a maximum value of 4 bits and thus an output of 4 bits can be effectively used without adversely affecting the process of the color component conversion unit 102 and the processes following to it. In the system shown in FIG. 9A, however, the number of bits used is actually in the range of from 3 to 4 bits and thus this system is a little disadvantageous. Further, in FIG. 9B, it is preferable that data converted to data of 4 bits does not exceed the value of input data when it is added with a bit "0" as it is and converted to 8 bits by normalization. With this arrangement, all the errors produced in the subtracters 807, 808 and 809 have a positive value and the values output from the adders 801, 802 and 803 also surely have a positive values accordingly, and thus no problem is caused. If a value obtained by normalizing an output shown in FIG. 9B exceeds an output value, the following cases will result.

First, an output from the subtracters 807, 808 and 809 may produce a negative error and thus an output from the adders 801, 802 and 803 may have a negative value. In this case, the output becomes 10 bits as an output by being added with a sign bit. Accordingly, the bit diminution units 804, 805 and 806 are composed of a table for an input of 10 bits. In this case, if an arrangement is such that when a negative value is input, an output from the table becomes 0 by rounding the value, data can be supplied to the color component conversion unit 102 without producing a negative output in the bit diminution units 804, 805 and 806, and thus such a disadvantage that values of R, G and B are negative is not caused.

Therefore, in the system shown in FIG. 8A in which bit diminution units 804, 805 and 806 are composed of a table, respectively, when an input value to the table exceeds the number of bits of R, G, B to an input unit 101, an output from the table is rounded within the number of bits input to the input unit 101 (255 types of representations in the case of 8 bits) and a negative input value is rounded to 0. As a result, the number of bits supplied to a color component conversion unit 102 is effectively used in a full range and an error diffusion processing is performed without causing a disadvantage that a negative value is produced, and thus a gradation corresponding to the gradation at the input unit 101 can be provided.

To supplement the above description, when an input value to the table exceeds the number of bits of R, G, B to the input unit 101, one bit of the output bits (4 bits in this embodiment) from the table is needed for an error diffusion and thus these bits cannot be effectively used. Further, a negative value less than 0 is output with respect to a positive or negative input value to the table, one more bit is used as a sign bit. In this case, a bit using efficiency is further lowered as well as the color component conversion unit 102 must process a not existing negative value of R, G, B, which is not theoretically correct and sometimes calculation cannot be performed.

As described above, according to this embodiment, the number of bits of image data can be diminished prior to the ADCT image compression process, and thus a circuit scale of the ADCT circuit can be diminished and input data having bits larger than those which can be processed by the ADCT circuit can be received.

Moreover, even if the number of bits of input image data is diminished, the errors caused by the diminution are divided to circumferential pixels, and thus luminance data or density or gradation data can be preserved, whereby the number of gradations achieved by the number of bits of the input image data can be preserved as it is.

Next, a further embodiment of the present invention will be described. This embodiment is characterized in that the diffusion of errors is also applied to the DC component obtained as a result of quantization in the ADCT. As described above, a difference between a quantized value of a usual DC component and a quantized value of a DC component in an 8×8 block positioned in front of the usual DC component by a pixel in the ADCT and coded. However, an error caused when the DC component is quantized is cut off as it is. Therefore, the density or gradation of an image is not preserved unless the frequency of occurrence or the size of positive errors and negative errors is normally distributed or the total of positive errors coincides with the total of negative errors over the entire image screen.

According to the embodiment of the present invention described above, errors produced when the DC component of an 8×8 block is quantized are diffused to nearby blocks or a circumferential 8×8 pixel block and the blocks diffused with the errors are quantized after the errors are added to the DC component. The DC component shows an average value of image data in the 8×8 block, and thus when this average value is preserved by the diffusion of the errors, a density or gradation of the image is preserved as a whole and a decrease in the reproduced number of gradations can be prevented.

Figure 10:
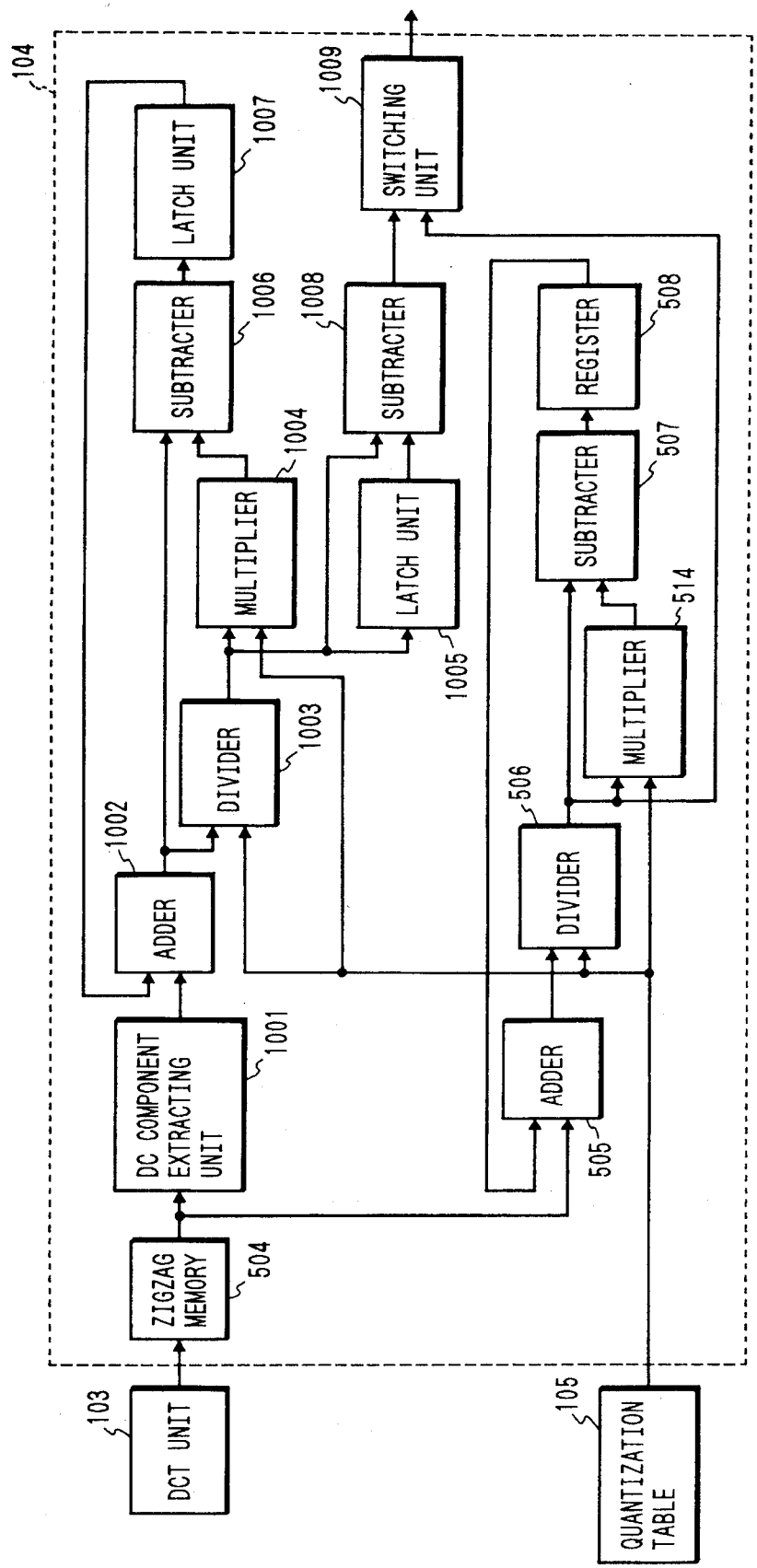
FIG. 10 is a diagram showing the arrangement of a third embodiment according to the present invention.

FIG. 10 is a diagram showing the arrangement of this embodiment.

All the errors of the DC component of this embodiment can be contained in a quantization unit 104. Since an error diffusion process for an AC component is described above, only an error diffusion process for a DC component will be described here. First, only a DC component as the head portion of data output from a zig-zag memory 504 as a result of an 8×8 DCT processing is latched by a DC component extraction unit 1001 and added with a quantization error of a DC component of an 8×8 pixel of a previous block by an adder 1002. An output from the adder 1002 is quantized by being divided by a DC coefficient of a quantization table 105 by a divider 1003 and rounded. A value obtained as a result of the division is multiplied by a DC quantization coefficient by a multiplier 1004 and a difference between a thus obtained value and an output from the divider 1003 is determined by a subtracter 1006 and serves as a quantization error. The quantization error is delayed by a block by being latched once by a latch unit 1007 and then added by the adder 1002 with an output from the DC component extraction unit 1001 which is a DC component of the next block.

On the other hand, the quantization data as the output from the divider 1003 is delayed by a block by being latched by a latch unit 1005 and supplied to a subtracter 1008, which subtracts the one-block-delayed data as an output from the latch 1005 from the quantization data as the output from the divider 1003 and outputs a thus obtained difference.

A switching unit 1009 switchingly and sequentially outputs the difference value of the DC component and the quantized value of the AC component.

Note that the description of the same elements in FIG. 10 as those in FIG. 5 is omitted.

What is claimed is:

1. An image processing method for processing image data arranged in image blocks, comprising the step of:

converting image data to a space frequency component for each image block; and diffusing a quantization error produced by quantizing a space frequency component of an image block to another space frequency component of the same image block.

2. An image processing device for processing image data arranged in image blocks, comprising:

conversion means for converting image data to a space frequency component for each image block;

quantization means for quantizing said space frequency component converted by said conversion means; and control means for controlling said quantization means so that a quantization error produced by quantizing the space frequency component of an image block is diffused to another space frequency component of the same image block.

3. An image processing method according to claim 1, wherein said quantization error is multi-dimensionally diffused to said other space frequency components.

4. An image processing method according to claim 1, further comprising the step of quantizing said space frequency component.

5. An image processing method according to claim 1, further comprising the step of assigning a Huffman code to said quantized space frequency component.

6. An image processing method according to claim 1, further comprising the step of transmitting said Huffman code.

7. An image processing method, comprising the steps of:

converting image data having a first number of bits to image data having a lesser number of bits; and diffusing an error produced in said conversion process to nearby image data and then converting the error-diffused image data into frequency component image data.

8. An image processing method according to claim 7, wherein the first converting step is an ADCT image compression/extension processing.

9. An image processing method for processing image data arranged in blocks, wherein the method is used in an ADCT image compression/extension processing, comprising the steps of converting image data to a space frequency component for each image block, quantizing a converted space frequency component and diffusing a quantized error produced by quantizing a space frequency component of a block to another frequency component of the image block.

\* \* \* \* \*

UNITED STATES PATENT AND TRADEMARK OFFICE
CERTIFICATE OF CORRECTION

PATENT NO. : 5,465,164
DATED : November 7, 1995
INVENTOR(S) : Susumu SUGIURA, et al.

It is certified that error appears in the above-indentified patent and that said Letters Patent is hereby corrected as shown below:

IN THE DRAWINGS

Sheet 7

Figure 8A, "ERRER" should read --ERROR-- (both occurrences).

Column 1

Line 43, "an" should be deleted.

Column 2

Line 67, "main" should read --the main--.

Column 3

Line 8, "reminder" should read --remainder--.
Line 40, "reminder" should read --remainder--.
Line 49, "reminder" should read --remainder--.

Column 4

Line 13, "dominator" should read --denominator--.

UNITED STATES PATENT AND TRADEMARK OFFICE
CERTIFICATE OF CORRECTION

PATENT NO. : 5,465,164
DATED : November 7, 1995
INVENTOR(S) : Susumu SUGIURA, et al.

It is certified that error appears in the above-indentified patent and that said Letters Patent is hereby corrected as shown below:

Column 5

Line 53, "corresponds" should read --corresponds to--.

Column 7

Line 7, "values" should read --value--.

Column 8

Line 54, "step" should read --steps--.

Signed and Sealed this

Fourteenth Day of May, 1996

*Attest:*

BRUCE LEHMAN

*Attesting Officer*      *Commissioner of Patents and Trademarks*